United States Patent [19]

Zoltan

[11] 4,187,422

[45] Feb. 5, 1980

[54] INTERNAL REFERENCE FOR STELLAR TRACKER

[75] Inventor: Bart J. Zoltan, Old Tappan, N.J.

[73] Assignee: The Singer Company, Little Falls, N.J.

[21] Appl. No.: 857,157

[22] Filed: Dec. 5, 1977

[51] Int. Cl.² ............................................. G01B 11/26
[52] U.S. Cl. .................................. 250/203 R; 356/152
[58] Field of Search ..................... 250/203 R, 203 CT; 356/152

[56] References Cited

U.S. PATENT DOCUMENTS 3,349,664 10/1967 Kohlenberger ..................... 356/152
3,990,796 11/1976 Foltz, Jr. .............................. 356/152

Primary Examiner—James B. Mullins
Attorney, Agent, or Firm—Laurence A. Wright; T. W. Kennedy

[57] ABSTRACT

A self-calibrating star tracker in which a light signal source located on the detector is reflected into the optics and redirected from the optics back onto the detector. In this manner, movement of the detector or optics from a known position can be sensed and calibration of the instrument can be conducted at any time (i.e., preflight or during the mission). The star tracker is contemplated to be used with an inertial guidance system and comprises a detector and optics.

7 Claims, 5 Drawing Figures

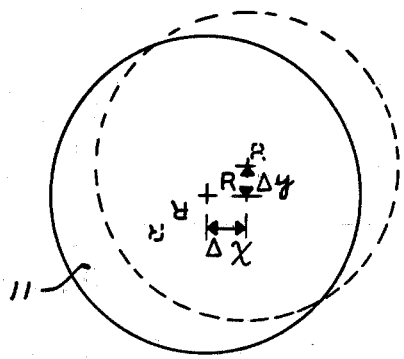
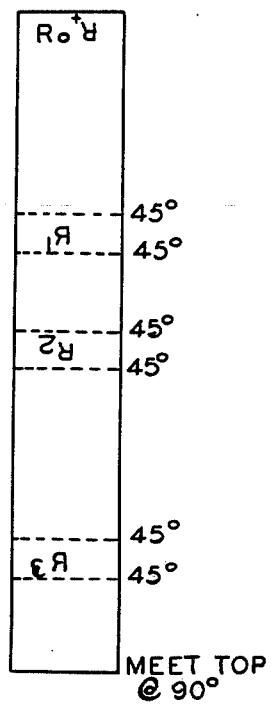
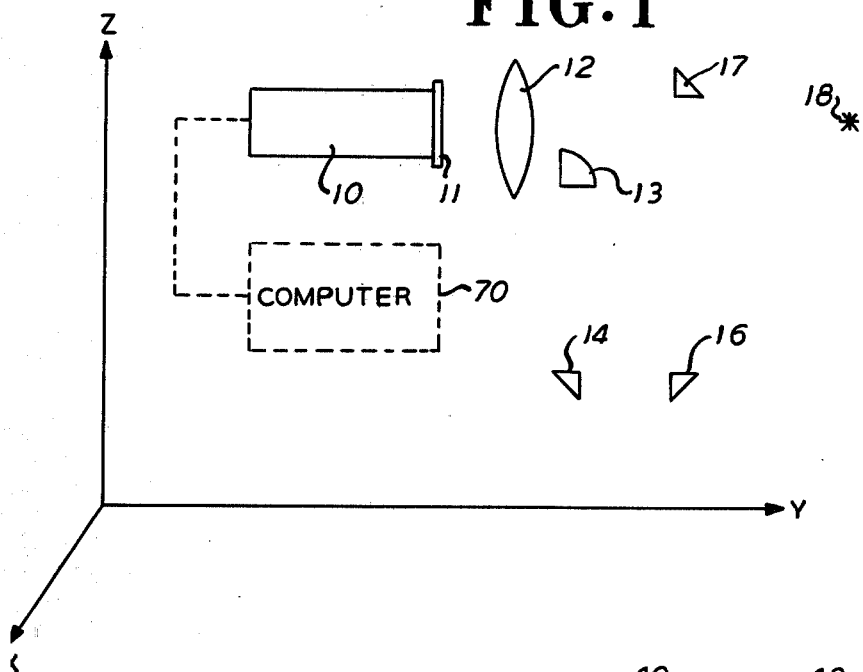
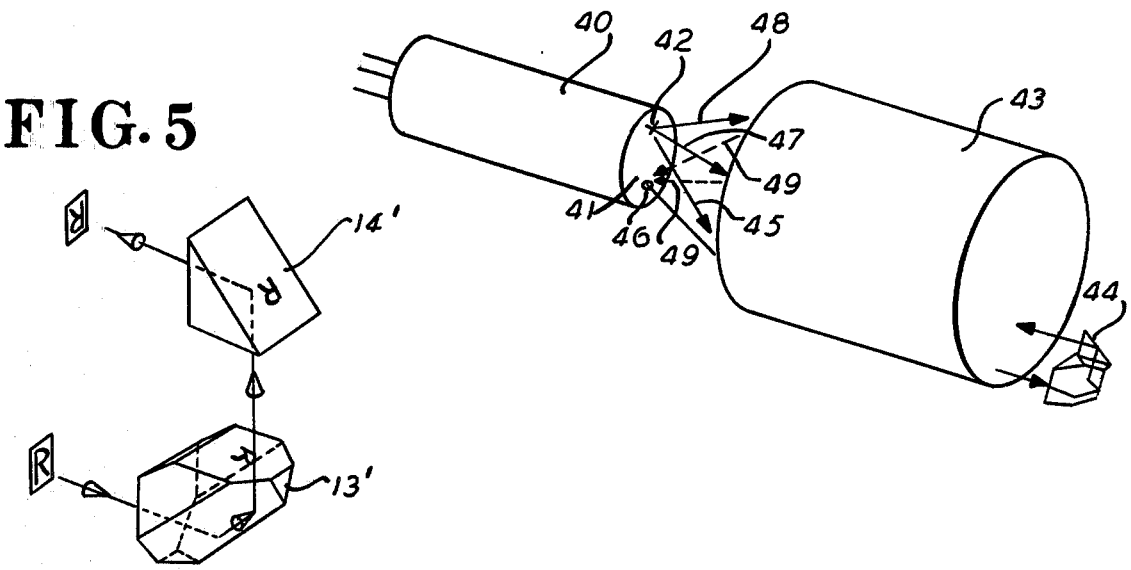

INTERNAL REFERENCE FOR STELLAR TRACKER

THE PRIOR ART

| | | |
|---|---|---|
| 3,242,795 | 3/1966 | John V. Hughes |
| 3,912,397 | 10/1975 | Bart J. Zoltan |
| 3,994,600 | 11/1976 | Michael Tarasevich et al |

This invention is related to inertial guidance system. More particularly, this invention is related to a star tracker for an inertial guidance system having means to evaluate the magnitude and direction of the motion of the stellar tracker relative to the inertial platform to which it is affixed and to perform evaluations during flight or just prior to use.

BACKGROUND OF THE INVENTION

As the requirement of navigation and navigation update systems reach more exquisite accuracies, the stability of the optics, and of the optical detector themselves come to limit the ultimate accuracy of a system whose shelf life is prolonged. The purpose of a stellar updating device as applied to inertial platforms, is to locate a reference star (or stars) within the systems field of view and through knowledge of the location of the star in inertial space to use this information for taking out platform error of the inertial system accumulated during the hostile environment of launch or takeoff. The effect of telescope, sensor, or structure motion relative to the platform on which accelerometers are mounted will be an error in the output of a stellar update system. It would be desirable to calibrate out any changes in sensor or optics position and to perform the calibration just prior to use or to calibrate throughout the mission itself.

Present calibration techniques require the use of several mirrored surfaces and external autocollimators. Moreover, present calibration techniques do not permit pre-flight, in-flight or real time calibration. Since previous methods did not permit calibration directly before use, the optical tracker is susceptible to all slow instabilities in component mounting and electronics drift.

BRIEF DESCRIPTION OF THE INVENTION

The present invention provides a self-calibrating star tracker in which a signal source is located on the detector and is reflected into the optics and redirected from the optics back onto the detector. In this manner, movement of the detector or optics from a fixed position can be sensed and calibration of the instrument can be conducted at anytime it is desired. The optics of the tracker system comprise a beam splitter, an assembly of prisms for inverting, reverting and reflecting the signal source and a vidicon detector.

Accordingly, it is an object of this invention to provide a stellar tracker for an inertial platform having means for calibration of the instrument during or just prior to flight.

This and other objects, features and advantages of the present invention will become apparent from the following description taken in conjunction with the accompanying drawings wherein:

FIG. 1 is a schematic diagram of the detector and optical assembly of the invention;

FIG. 2 is a representation of the faceplate of the detector shown displaced from its original position;

FIG. 3 is a representation of the manner in which the image is inverted, reverted and reflected by the beam splitter;

FIG. 4 shows the detector having a luminiscent spot or a light emitting diode on its faceplate; and FIG. 5 shows the optical elements for inverting, reverting and reflecting the image.

Turning now to FIG. 1, there is shown in schematic outline the basic components of the star tracker of the invention. It is contemplated that the star tracker of the invention will be employed in an inertial guidance system. However, the invention may have other uses as is clear to those skilled in the art. In FIG. 1, the optical tracker is oriented in relation to the inertial system along three mutually orthogonal axes X, Y and Z. In FIG. 1, a vidicon detector 10 is depicted. However, other forms of detectors could be substituted as is well-known in the art. Light from a star 18 is focused by lens 12 onto the faceplate 11 of vidicon 10. The output of vidicon 10 is then processed in computer 70 to determine the position of the vehicle in which the star tracker is mounted vis-a-vis the star. Means for processing the output information from vidicon 10 are well-known to those in the art and are not shown herein. In this invention, vidicon 10 is provided with a source of light on faceplate 11. The location of this source of light in faceplate 11 is outside of the star detector range. Light emitted from the faceplate 11 is collimated by means of lens 12 onto Amici lens or beam splitter 13 where the image is inverted, reverted and reflected to right and prism 14 where it undergoes a 90° directional change at the output of prism 14. Another 90° directional is undergone in right angle prism 16 and a final 90° change of the signal takes place at the output of right angle lens 17. The signal is projected from lens 17 onto focusing lens 12 and thence back onto faceplate 11 in the signal detecting area. If, as shown in FIG. 2, vidicon 10 has been displaced, the image would have appeared to move by a discrete amount shown here as $\Delta X$ and $\Delta Y$.

FIG. 4 shows detector 40 having a light source 42 located at faceplate 41. Light source 42 may be a luminescent spot or a light emitting diode which emits light when periodically swept by the vidicon beam. Light rays leaving light source 42 travel in all directions as shown by arrows 45, 47 and 48. Some of this light impinges on primary optics 43 and is collimated on beam splitter 44. This lens inverts and reverts the image and reflects it back to primary optics 43. The light thus emitted as rays 49 forms an image spot 46 on faceplate 42.

Turning back to FIG. 1, if detector 10 were displaced relative to the system in which it is mounted, then the apparent location of the star 18 in platform coordinates will have changed by an amount angularly equivalent in the optics field of view to the linear displacement of detector 10. A motion as slight as 0.000050" can be significant for accurate systems. In a system using a vidicon as a detector, not only is a change in detector position an error source, but also any change in the scanning electronics is a source of error. The problem is to provide means to calibrate out detector motion or electronics degradation prior to or during flight using existing technology.

The vidicon faceplate 11 of detector 10 is larger than the optical search area (i.e. the area confined to search for stellar light). As illustrated in FIG. 4, a spot 41 of phosphorescent material or a light emitting diode may be placed on faceplate 11 just outside the search area. The spot will be activated by the scanning electron beam of the vidicon. Thus a spot of light is created at the focal plane of the lens 12. There are other equally simple means of having a spot of light appear in the focal plane. It is understood that if the calibration is preflight or premission then the light spot on the faceplate need not be scanned by the vidicon electron beam during the mission.

The above described spot of light passes out the same optics which are used for stellar detection. Beam splitter 13, which may be smaller than the optical aperture, is placed in front of the optics 12. The now collimated light is reflected to an assembly of prisms 14, 16 and 17 which are affixed to the same plane on the platform as the accelerometer. Prisms 14, 16 and 17 are arranged to invert and revert the image and, after some combining optics, redirects the light towards optics 12. The optics in turn focus this light on the detector plane and the vidicon 10 detects the location of this reverted and inverted image.

FIG. 2 shows an enlarged front view of faceplate 11 and on it an image. If faceplate 11 were to move $\Delta X$ and $\Delta Y$, the object would move with but the image will be displaced in the $-X$ and $-Y$ directions (i.e. monitor fixed coordinates). Thus, the location of the image as measured by the vidicon 10 will have moved by an amount $-2\Delta X$ and $-2\Delta Y$ and this error can be subtracted out by the data processing electronics (not shown). By using partially mirrored surfaces on some of the prisms, the change in angular alignments, if any, of the prisms themselves can be evaluated. This would be possible because several images would be refocused on the faceplate. The intensity of each image would act to identify it.

FIG. 3 is an aid in envisioning the function of beam splitter 13. $R_0$ is the object in this system of prisms. Any inverting and reverting prism will project $R_0$ to $R_1$, $R_1$ to $R_2$ and $R_3$ are the images as seen in these reflecting surfaces. Finally, $R_4$ is the image $R_0$ as projected back onto the same (i.e. original) plane. As $R_0$ moves in a $+X$, $+Y$ direction, $R_4$ will move in the $-X$, $-Y$ direction.

FIG. 5 illustrates a system of lenses wherein two of the right angle prisms 16 and 17 of FIG. 1 are eliminated. The optical effects are identical. The two prisms 13' and 14' may in fact be a single assembly either manufactured as a custom item or by affixing the two components together.

Although specific embodiments of the invention have been shown and described, it will be obvious to those skilled in the art that various modifications may be made without departing from the spirit of the invention which is intended to be limited solely by the appended claims.

What is claimed is:
1. A stellar tracking system comprising:
   means for detecting the presence of a source of stellar light,
   means for focusing said stellar light on said detecting means,
   means on said detecting means indicating the orientation of said detecting means relative to a fixed position, and
   means responsive to said orientation means for indicating the deviation of said detecting means from said fixed position.
2. The stellar tracker of claim 1 comprising:
   a detector having a faceplate larger than the search area of said focusing means, and
   a source light positioned on said detector outside of said search area said detector periodically activating said source of light upon command.
3. The stellar tracker of claim 2 comprising:
   optical means for inverting and reverting said source of light and refocusing said source of light on said detecting means in said search area, whereby said tracker is enabled to determine the deviation of said tracker from said fixed position.
4. The stellar tracker of claim 3 comprising a beam splitter and a pair of right angle prisms for inverting and reverting said source of light.
5. A stellar tracking system comprising:
   a detector for detecting the presence of a source of stellar light,
   optical elements positioned in the optical plane of said detector for focusing said stellar light onto said detector, and
   a signal light source positioned on said detector outside of the tracking range of said optical elements for indicating the orientation of said tracker relative to a fixed position.
6. The stellar tracker of claim 5 comprising:
   a beam splitter in said optical elements for inverting and reverting said signal light source and refocusing said signal light source on said detector inside of the tracking range.
7. The stellar tracker of claim 6 comprising:
   a computer connected to the output of said detector for determining the position of said tracker from said fixed position and from said source of stellar light.

* * * * *